United States Patent Office 3,098,028
Patented July 16, 1963

3,098,028
PLUTONIUM ELECTROREFINING CELLS
Lawrence J. Mullins, Jr., Joseph A. Leary, Carl W. Bjorklund, and William J. Maraman, Los Alamos, N. Mex., assignors to the United States of America as represented by the United States Atomic Energy Commission
Filed Feb. 17, 1961, Ser. No. 90,152
1 Claim. (Cl. 204—245)

The present invention relates to the electrorefining of plutonium metal, and more specifically to apparatus or cells in which such electrorefining is accomplished.

Such apparatus is useful in the purification of plutonium to the point where it contains less than 0.02 weight percent total impurities, either in large scale batch production or continuous production. The feed material may be in the form of plutonium alloys as well as originally pure plutonium and may come from any of several sources, such as reactor fuels, scrap metal, and the bomb reduction product, which is obtained by the calcium reduction of plutonium tetrafluoride.

The purified product is useful in several applications such as nuclear reactor fuels, with or without alloying, and in metallurgical studies. A more recent utilization is as a primary analytical standard.

It is the general object of the present invention to provide apparatus for the large scale electrorefining of plutonium, either batchwise or continuous.

A further object is to provide such apparatus in which the purified plutonium is collected as a liquid during operation.

Another object is to provide a cell or apparatus for the electrolytic purification of plutonium using the impure feed material as the anode, fused salts including a plutonium salt as the electrolyte and in which the purified plutonium may be collected in the liquid form during operation.

An additional object is to provide the last named type of apparatus in which the purified plutonium may be collected or cast in predetermined shapes.

Figure 1:
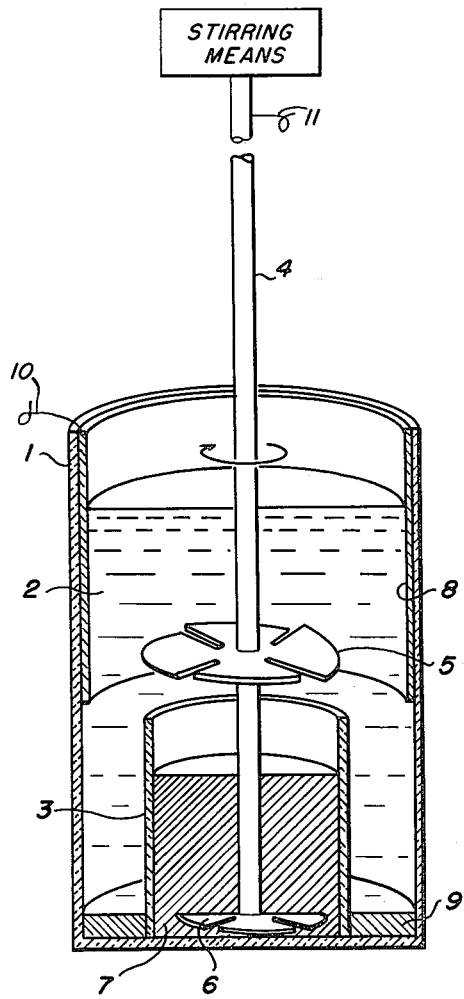
Figure 2:
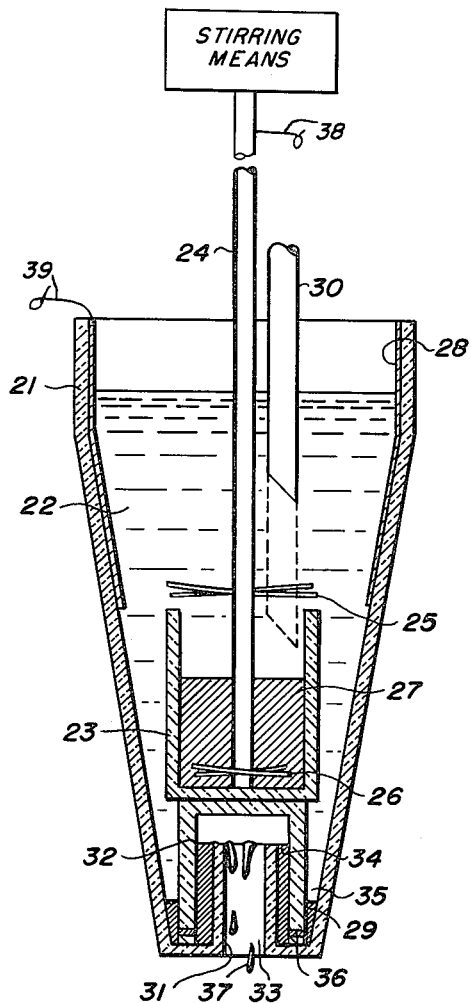

To better enable those skilled in the art to understand the present invention, a drawing is attached hereto, in which drawing:

FIGURE 1 represents the simplest form of the present invention, depicting a vertical axial partial section of a perspectively disposed cell suitable for large scale batch operation, and FIGURE 2 is a vertical axial section of an electrorefining cell of the present invention especially adapted for continuous operation. This cell is a modified form of the FIGURE 1 embodiment, as is more fully developed below.

Turning now to FIGURE 1, it will be seen that the cell consists essentially of an outer ceramic vessel 1 containing a fused salt electrolyte 2 and an inner shorter ceramic vessel 3 separated from outer vessel 1 by an annulus filled with electrolyte 2. Inner vessel 3 serves as the container for the impure plutonium anode 7.

Depending from exterior structure (not shown) and extending into anode 7 is a metallic rod 4. This rod 4 serves both as anode lead 11 and as a shaft for stirrer blades 5 and 6 mounted thereon. Each of these stirrer blades is important, and can be stirred by means well known in the art with the upper stirrer 5 circulating the electrolyte and thus preventing the isolation of a plutonium depleted layer adjacent cathode 8 and lower stirrer 6 promoting contact between the plutonium in anode 7 and electrolyte 2. The plutonium which plates out on the cathode drips to the bottom of vessel 1 and collects in a pool 9.

Cathode 8 is mounted on the inside of outer vessel 1, partially extending therefrom and largely immersed in the electrolyte. Cathode 8 is connected to a power supply (not shown) by cathode lead 10. While it may be immersed to a greater depth than that shown, corresponding to the top of inner vessel 3, little increase in performance is obtained thereby. It is important, however, that the surface of cathode 8 be large enough to maintain a low current density and thereby prevent depletion of the plutonium ions in the vicinity of the cathode. Such a condition would cause other metallic ions (e.g., sodium) to plate out on the cathode, contaminating the product and creating a fire hazard.

Electrolyte 2 is a combination of fused salts having a relatively low melting point, and obviously must include a plutonium salt. In the specific work to be described in greater detail below, a chloride electrolyte was used, consisting of 10 weight percent (w/o) plutonium trichloride, 50.4 w/o potassium chloride and 39.6 w/o sodium chloride. Other halides may be used, i.e., LiCl, KCl, $BaCl_2$ or any other alkali metal halide or alkaline earth metal halide or any combination thereof.

The electrode materials must be those which will not contaminate the highly corrosive liquid plutonium. In the examples below, a tantalum cathode was used for the first runs, but the substitution of tungsten decreased the tantalum content of the product without appreciably increasing its tungsten contamination. A tantalum stirrer was used throughout, but may be made of tungsten as well.

In all but one run below, both vessel 1 and 3 were of highly vitrified alumina ($Al_2O_3$). The exception is run D, where the vessel was alumina partially coated with calcia (CaO), with little observed difference. It is expected that the use of monolithic calcia containers will further reduce aluminum in the product.

In FIGURE 2, two digit numbers consisting of a first digit "2" followed by a digit corresponding to the digit used to identify the like part of the FIGURE 1 embodiment have been employed. Thus 21 is the outer ceramic container, 22 the electrolyte, and 23 the inner ceramic container holding the impure liquid plutonium anode 27. The stirrer rod 24-anode lead 38 has stirrer blades 25 and 26 mounted thereon, 28 is the cathode and cathode lead 39, and 29 the pool of plutonium dripping from the cathode.

The outer container or vessel 21 is tapered to define a relatively small bottom to minimize plutonium metal hold-up, thus avoiding the possibility of collecting a critical quantity of plutonium, and has a reentrant portion 31 extending upwardly from its bottom wall to define a central opening 33. An inverted third ceramic vessel or cylinder 32 is disposed coaxially with reentrant portion 31 and is cemented to the bottom of vessel 21 to define the separated annular gaps 34 and 35. The inside height of member 32 is sufficiently greater than the height of reentrant member 31 to permit the overflow of plutonium which passes through holes 36 in member 32 and fills the annular space 34. The plutonium thus discharged as drops 37 is collected in suitable casting molds, not shown.

Vessel 23 is supported on inverted vessel 32, and the two may be made integral or may be cemented together. A tantalum or tungsten tube 30, which can be raised and lowered, fits through an appropriate opening in blade 25 for adding fresh material to anode 27 as the latter is consumed.

The first cell described above has been used in a vessel 1 having the dimensions 4 inches high by 2 5/8 inches O.D. by 3/32-inch wall thickness, while inner vessel was 1 1/2 inch O.D. by 1 3/4 inches high by 3/32-inch immersed in the electrolyte 2, which filled vessel 1 to within about one inch of the top. After outgassing the cell for two hours under vacuum at 700° C., the impure plutonium was loaded into inner vessel 3 as a solid cylinder and then the chlorides were added, also as solids. In each case the weight of the plutonium anode was about 300 grams.

The entire cell was placed in a 3-inch diameter stainless steel tube in a commercial tube furnace. The plutonium and electrolyte were melted by heating them to about 780° C. under a helium blanket, after which the temperature was reduced to and maintained at about 700° C. during the balance of the process, also under helium. The stirrer means was activated and run at a speed of about 1200 revolutions per minute during each experiment.

A steady state voltage of 2.0 volts was applied between electrodes during each run. Each run was halted prior to complete consumption of the anode, after 27 hours or more. The anode lead-stirrer assembly was removed, after which the contents of the cell were allowed to cool to room temperature in place. The cell was then broken, and the plutonium product recovered as an annular metal casting. This casting was sampled by cutting wedges which were pickled in various acids prior to analysis.

Pertinent conditions for each run other than those already mentioned are listed below for each of four runs, together with analyses of the feed plutonium and the product plutonium. Iron, tungsten and tantalum were determined colorimetrically. Carbon and oxygen were determined by combustion analysis, while all remaining elements were determined spectrochemically.

separate anode and cathode by a short distance and define a gap for the collection of the purified liquid plutonium deposited on the cathode. Important features are the addition of stirrer blades on the anode lead and a large cathode surface to insure a low current density.

What is claimed is:

A plutonium electrorefining cell comprising a generally cylindrical first ceramic container having an outer cylindrical wall and a reentrant sleeve extending up from its bottom with an open top, a second ceramic container in the form of an inverted cylindrical cup disposed between the outer wall and the reentrant sleeve of said first container to define outer and inner annuli therewith, said second container having at least one fluid passageway therethrough near the bottom of said first container, a third ceramic container in the form of an open top cylinder supported from the inverted bottom of said second container, a cathode sleeve adjacent the inside surface of said first container extending to at least the top of said third vessel, an anode rod extending down to the bottom of said third container and having at least two stirrer blades mounted thereon, one at the end of said anode rod and one in said first container, tube means for adding plutonium to said anode, said cathode, anode rod, stirrer blades and tube means being selected from the class of metals consisting of tungsten and tantalum, means for applying a constant voltage between said anode rod and said cathode, and a means for rotating said anode rod.

ELECTROREFINING RUNS USING $PuCl_3$—NaCl—KCl ELECTROLYTE CONDITIONS AND ANALYSES (in p.p.m.)

|  | Run A | Run B | Run C | Run D (using CaO on $Al_2O_3$) |
|---|---|---|---|---|
| Duration, hr | 26.9 | 36.7 | 20.0 | 27.0 |
| Anode | Pu-2.5 w/o Fe | Pu | Pu | Pu. |
| Cathode | Ta | Ta | W | W. |
| Avg. amperes | 3.88 | 2.87 |  | 2.44. |
| Product grams | 222 | 278 | 123 | 169.8. |
| Cathode eff | 71.4% | 89.4% |  | 83%. |

|  | Feed | Prod. | Feed | Prod. | Feed | Prod. | Feed | Prod. |
|---|---|---|---|---|---|---|---|---|
| Element: |  |  |  |  |  |  |  |  |
| Li | <0.2 | <0.2 | <0.2 | <0.2 | <0.2 | <0.2 | <0.2 | <0.2 |
| Be | <0.2 | <0.2 | <0.2 | <0.2 | <0.2 | <0.2 | <0.2 | <0.2 |
| Na | <10 | <10 | <10 | <10 | <10 | <10 | <10 | <10 |
| Mg | 30 | 30 | 15 | <5 | 80 | <5 | 80 | <5 |
| Ca | <5 | <5 | 20 | <5 | 25 | 15 | 25 | <5 |
| Al | 20 | 35 | 90 | 20 | 25 | 28 | 25 | 15–20 |
| La | <10 | <10 | <10 | <10 | <10 | <10 | <10 | <10 |
| Si | <100 | <10 | 20 | <10 | 35 | <10 | 35 | <10 |
| Pb | <20 | <1 | <1 | <1 | <1 | <2 | <1 | <2 |
| Cu | 20 | 1 | 7 | <1 | 2 | <2 | 2 | <2 |
| Ni | <100 | <10 | 50 | <10 | 35 | <10 | 35 | <10 |
| Cr | <100 | <10 | 10 | <5 | 10 | <5 | 10 | <5 |
| B | <10 | 0.5 | <0.5 | <0.5 | <0.5 | <0.5 | <0.5 | <0.5 |
| Mn | <20 | <1 | 15 | <1 | 5 | <2 | 5 | <2 |
| Sn | <20 | <1 | <1 | <1 | <1 | <1 | <1 | <1 |
| Bi | <20 | <1 | <1 | <1 | <1 | <1 | <1 | <1 |
| Co | <5 | <5 | <5 | <5 | <5 | <5 | <5 | <10 |
| Zn | <200 | <10 | 10 | 10 | <10 | <10 | <10 | <10 |
| Ag |  |  |  |  | <1 |  |  |  |
| Fe | $2.5 \times 10^4$ | 178 | 60 | 20 | 80 | <20 | 80 | <15 |
| W |  |  |  |  | <20 | 12 | <20 | <32 |
| Ta | <5 | 270 | 280–490 | 600–220 | <50 | <35 | <50 | <35 |
| C | 80 | 60 | 140 | 35 | 140 | 32 | 140 | <15 |
| $O_2$ | 90 |  | 135 | 25 | 135 | 25 | 135 | 15 |

It is believed to be apparent from a comparison of the data for these runs that tungsten is a superior cathode material in electrorefining plutonium, and that plutonium of 99.98% purity can be obtained from the comparatively crude product of the bomb reduction process, as used in all of the work summarized above. Note also, the tremendous reduction in iron concentration from Run A.

In general, the electrorefining cell of the present invention comprises an impure liquid plutonium anode, a molten salt electrolyte, and a non-reactive cathode, all being contained in non-reactive ceramic containers which

References Cited in the file of this patent

UNITED STATES PATENTS

| 885,761 | Kern | Apr. 28, 1908 |
| 2,760,930 | Alpert et al. | Aug. 28, 1956 |
| 2,776,184 | Kamen | Jan. 1, 1957 |
| 2,867,568 | Cunningham | Jan. 6, 1959 |
| 2,923,670 | Bjorklund et al. | Feb. 2, 1960 |
| 2,987,462 | Chauvin et al. | June 6, 1961 |

FOREIGN PATENTS

| 164,283 | Australia | Apr. 8, 1954 |